Patented Dec. 28, 1926.

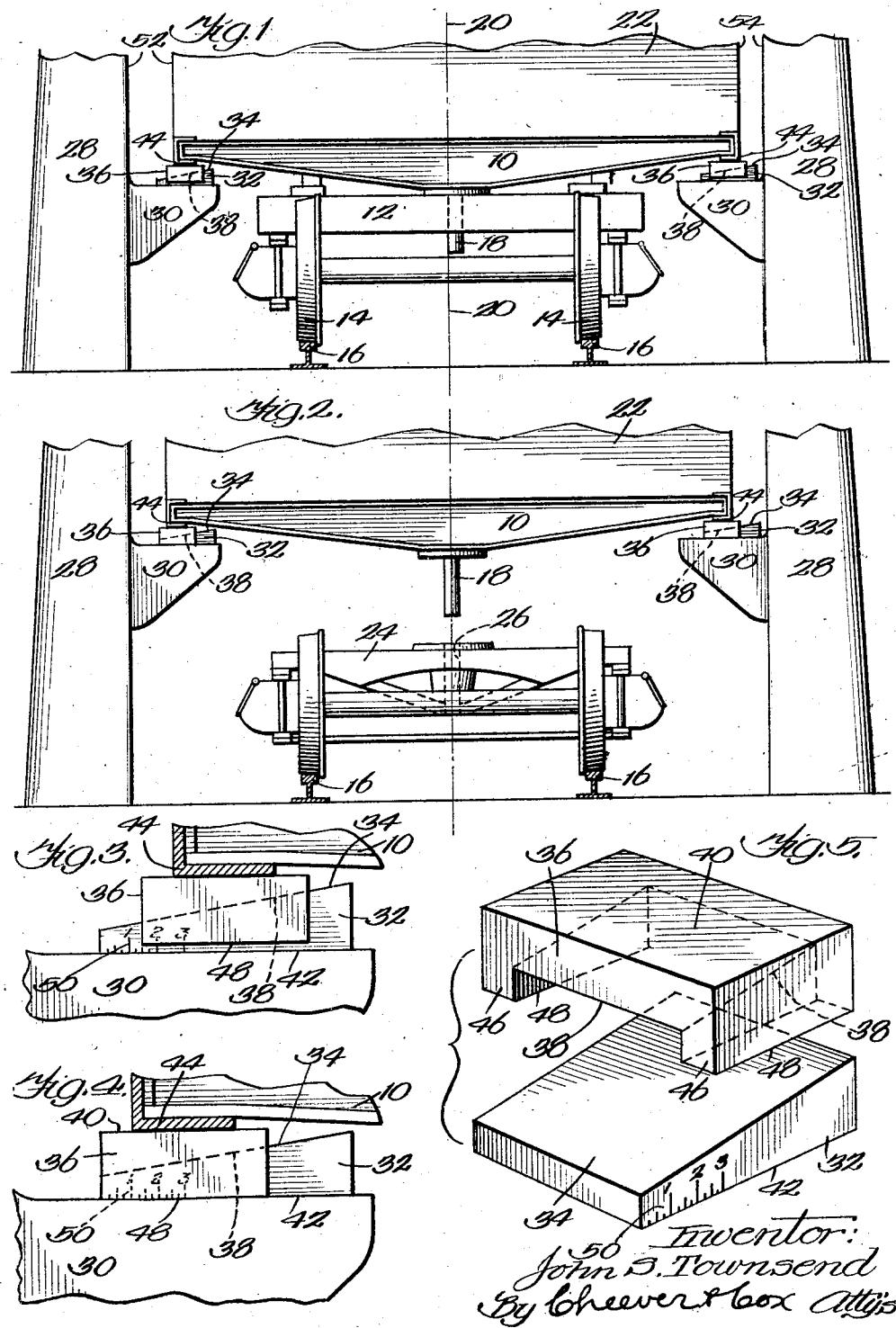

1,612,401

UNITED STATES PATENT OFFICE.

JOHN S. TOWNSEND, OF HARVEY, ILLINOIS, ASSIGNOR TO WHITING CORPORATION, OF HARVEY, ILLINOIS, A CORPORATION OF ILLINOIS.

SHIFTING DEVICE FOR HEAVY-BODY HOISTS.

Application filed April 21, 1923. Serial No. 633,587.

This invention relates to mechanism by the use of which a heavy, cumbersome body —as, for instance, that of a freight or passenger car—may be shifted in a desired direction, usually laterally, on a fixed jack sustaining such object in elevated position so that the car or other heavy body may be centered or otherwise positioned with reference to a truck or the like with which it is ultimately to cooperate. The invention consists in mechanism for attaining the foregoing objects, more particularly in a special sliding wedge device which can be easily and cheaply made; is satisfactory in use and is not readily liable to get out of order.

Still more particularly, the invention consists in numerous features and details of construction which will be hereafter more fully set forth in the specification and claims.

Referring to the drawings, Figure 1 shows an end view of a car body temporarily mounted off center on a jack equipped with the mechanism of this invention, ready to lift the car body off from the truck and shift it laterally so that it will be in centered position with reference to a truck which supports it.

Figure 2 is a changed position view of the parts of Figure 1, a new truck having been substituted and the car body having been shifted to centered position with reference to this truck.

Figure 3 is a side view of the wedge shifting mechanism of this invention in the position of Figure 1.

Figure 4 is a corresponding view of the parts in the position of Figure 2.

Figure 5 is a perspective view of the parts of the wedge device separated one from the other.

In the car building art, it is common practice as soon as the lower frame parts 10 of a car are assembled to place them on any convenient shop trucks 12, having wheels 14, adapted to travel on tracks 16, extending through the shop, and to do this without any special reference as to whether the king pins 18 at each end of the car are centered on the trucks 12 and consequently with reference to the medial line 20 of the rails 16. As a matter of fact in this temporary mounting, the king pins are usually off from the center line 20, as shown in Figure 1, sometimes one king pin being one side of the line while the pin at the other end of the car is the other side of the central line.

After the car body 22 has been constructed, painted, etc., during which one or both ends of the car may have been shifted in one manner or another laterally of their supporting trucks 12, the car body is lifted off from the temporary trucks 12 and placed upon permanent trucks 24 to thereafter belong to that particular car with the king pins 18 taking bearing in the respective conventional pivoting devices 26 provided on said new trucks for them.

There are on the market and in actual use one or more car body hoisting devices shown conventionally in the drawings, the same consisting of stationary supports 28 arranged along the side of the car track 16, each such support being equipped with a vertically movable hook 30 passing under the lower edge of the car frame 10 and power elevatable by means not entering into this invention to lift the car body from the position of Figure 1 to the height shown in Figure 2, thereby permitting the substitution of the permanent trucks 24 for the temporary trucks 12.

The object of this invention is to provide means by which the heavy car body 10 may, while supported by the trucks 12, and while being elevated, shift itself without material outside assistance from the off centered position of Figure 1 to the position of Figure 2 where it is substantially accurately centered over the truck or trucks 24 with which it is to finally cooperate. The desired result is accomplished by providing a pair of wedge blocks as shown in the drawings for each of the hooks 30, the same including a base block 32 adapted to be more or less permanently placed upon a lifting hook 30 with its upper, inclined surface 34 depressed in the direction along the hook which the car body tends to move and an upper sliding block 36 having an inclined surface 38 sliding on surface 34, and an upper surface 40 parallel with the base 42 of block 32, adapted to be engaged by the adjacent bottom edge 44 of the car frame 10. The upper wedge block 36 is provided with downwardly extending side flanges 46 embracing the sides of block 32 to insure the upper wedge members traveling up and down inclined surface 34 and in no other direction. These flanges 46 are also of such a depth that in the position of Figure 4, their bottom edges 48 rest directly upon the upper surface of the adjacent hook 30 with the result that when they reach these points of contact, the wedge 36 can move no further with reference to the hook 30. The flanges 46 are as wide as the upper block and their bottom faces 48 bear on the hook 30 or other fixed support across this entire width, thus insuring safe carrying of the load to the hook.

The angularity of co-acting surfaces 34 and 38 is such that when the operator starting with the parts in the position of Figure 1 operates the power devices of hooks 30 to cause them to lift the car body off from the temporary truck 12, there comes a point at which there is a component of the downward pressure of the car body 10 acting along each surface 34 of sufficient strength to cause the car body to shift to the left as shown in the drawings along the surfaces 34 of the wedges 32 which support that particular part of the car body. In actual practice, this movement takes place ⅛ or ¼ of an inch at a time so that there is no material disturbance in the equilibrium of the various parts. Having provided the mechanism described, the problem is to so use it that the car will automatically shift itself from the off-centered position of Figure 1 to the centered position of Figure 2 without material manual assistance. To accomplish this desired result, the operator first measures up one or both of the spaces 52 and 54 between the car sides and the respective supports 28 and determines the exact distance the particular car end to be centered is off center. He then takes the two pairs of wedges which are to be used in the particular centering operation and places the upper wedge 36 of each pair so that its left hand end, as viewed in the drawings, is the required distance on the scale 50 provided for the purpose from the lower end of wedge 32. In the drawings, assuming the scale 50 is in inches, the upper wedge 36 is shown placed at 1½ inches along wedge 32, said inch and a half being the distance which the car end requires shifting. Having prepared two sets of wedges in this way, the operator lowers the hooks 30 sufficiently so that he can place the wedges under the car edges 48 with the lower or left hand ends of the wedges 32 in each instance pointed in the direction the car is to shift. In this operation, the only important point is to see that when the hooks 30 are again elevated so as to exert pressure through the wedges 32—36 on the car edges, the two wedges still remain in this inch and a half relationship with reference to each other. In other words, it is unnecessary to pay any attention to having each lower wedge 32 in any particular position longitudinally of its own hook 30.

Having placed the properly positioned wedges on the respective hooks and under the car edges, the operator has simply to apply power to hooks 30 to elevate the car off from the temporary truck 12 during which operation the car will, while resting on wedges 36 automatically slide itself along the inclined surfaces 34 of wedges 32 the required inch and a half, in the particular case here illustrated, until the lower surfaces 48 rest upon the adjacent upper surfaces of hooks 30, whereupon further longitudinal movement of the car ceases, regardless of how high the car may be elevated to or through the position of Figure 2. In other words, the car has centered itself to line 20 so that after reaching the position of Figure 2, all the operator has to do is to lower the car onto the new trucks 24 permanently belonging to the car.

The device has been successfully commercially used in car building work and it is accordingly so shown and described; but the invention may be applied to lifting other objects without in any way departing from this invention.

Having thus described my invention, what I claim as new and desire to secure by Letters Patent is:

1. In mechanism of the class described, a load support movable to assume the weight of a load; and wedge means interposed between the load and support automatically operable to shift said load with respect to the support when the latter assumes the weight of the load.

2. In mechanism of the class described, a load support movable to assume the weight of a load, and wedge means interposed between the load and support operable by the weight of a load assumed by the support to shift said load with respect to the support.

3. In mechanism of the class described, a load support movable to assume the weight of a load, a wedge device interposed between the load and support operable by the weight of a load assumed by the support to shift said load with respect to the support, and means embodied in said wedge device for variably predetermining the extent of said shift.

4. In mechanism of the class described, a load support movable to assume the weight of a load, and means interposed between the support and load engageable with the latter at spaced points and operable under the influence of the weight of a load assumed by the support to shift said load with respect to the support.

5. In mechanism of the class described, a load support movable to assume the weight of a load, and a plurality of spaced wedge devices interposed between the support and load simultaneously operable under the influence of the weight of a load assumed by the support to shift said load with respect to the support.

6. In mechanism of the class described, a pair of superimposed wedges having abutting inclined surfaces with the upper of said wedges freely movable along the inclined surface of the lower wedge, and means independent of one of the wedges to limit movement of the upper wedge down the inclined surface of the lower wedge.

7. In mechanism of the class described, a pair of superimposed wedges having abutting inclined surfaces with the upper of said wedges freely movable along the inclined surface of the lower wedge, and means carried by the upper wedge limiting movement of the latter down the inclined surface of the lower wedge.

8. In mechanism of the class described, a pair of superimposed wedges having abutting inclined surfaces with the upper of said wedges freely movable along the inclined surface of the lower wedge, and means carried by one of the wedges limiting movement of the upper wedge down the inclined surface of the lower wedge.

9. In mechanism of the class described, a pair of superimposed wedges having abutting inclined surfaces with the upper of said wedges freely movable along the inclined surface of the lower wedge, and downwardly directed portions on the upper wedge extending respectively over the sides of the lower wedge, said portions being engageable at their free ends against a stationary support to limit movement of the upper wedge down the inclined surface of the lower wedge.

10. In a device of the class described, a supported block having an upper inclined wedge surface, a second block having a bottom inclined surface coacting with the wedge surface of the first block and an upper load receiving surface and means extending down the side of the second block, substantially as long as the length of the inclined wedge surface, having a bottom face, adapted when the upper block reaches a predetermined point along the wedge surface to take bearing along substantially its entire length on a fixed support and carry the weight of the load on the second block to the fixed support.

In witness whereof, I have hereunto subscribed my name.

JOHN S. TOWNSEND.